United States Patent
Clever

(10) Patent No.: US 10,336,604 B2
(45) Date of Patent: Jul. 2, 2019

(54) BREAKAWAY HOSE SUPPORT

(71) Applicant: Bryan William Clever, Liberty Township, OH (US)

(72) Inventor: Bryan William Clever, Liberty Township, OH (US)

(73) Assignee: OPW FUELING COMPONENTS, LLC, Hamilton, OH (US)

( * ) Notice: Subject to any disclaimer, the term of this patent is extended or adjusted under 35 U.S.C. 154(b) by 151 days.

(21) Appl. No.: 14/621,941

(22) Filed: Feb. 13, 2015

(65) Prior Publication Data

US 2016/0238177 A1    Aug. 18, 2016

(51) Int. Cl.
| | |
|---|---|
| *B67D 7/40* | (2010.01) |
| *B67D 7/32* | (2010.01) |
| *F16L 55/10* | (2006.01) |
| *B67D 1/00* | (2006.01) |
| *F16L 37/32* | (2006.01) |
| *F16L 3/00* | (2006.01) |
| *F16L 3/01* | (2006.01) |
| *F16B 31/02* | (2006.01) |

(52) U.S. Cl.
CPC ............ *B67D 7/40* (2013.01); *B67D 7/3218* (2013.01); *B67D 1/00* (2013.01); *F16B 31/021* (2013.01); *F16L 3/003* (2013.01); *F16L 3/01* (2013.01); *F16L 37/32* (2013.01); *F16L 55/1015* (2013.01)

(58) Field of Classification Search
CPC ......... F16L 3/003; F16L 3/01; F16L 55/1015; F16L 37/32; B67D 1/00; B67D 7/3218; B67D 7/40; F16B 31/021

USPC ............ 137/68.11, 68.14, 68.15; 222/71–75; 141/382, 387, 389; 248/62, 63, 909; 285/1, 62, 124.2, 124.3, 276, 277, 304; 403/326, 327, 375, 376

See application file for complete search history.

(56) References Cited

U.S. PATENT DOCUMENTS

| | | | | | |
|---|---|---|---|---|---|
| 2,694,601 | A | * | 11/1954 | Higginbotham | B67D 7/40 137/355.25 |
| 2,742,320 | A | * | 4/1956 | Grise | B67D 7/40 137/355.23 |
| 2,986,364 | A | | 5/1961 | Vestal | |
| 3,160,333 | A | * | 12/1964 | Budrow | B67D 7/40 137/355.2 |
| 3,484,912 | A | * | 12/1969 | Crain | F16L 23/10 24/279 |
| 3,944,023 | A | * | 3/1976 | Fisher | A62B 1/20 182/48 |
| 4,042,184 | A | | 8/1977 | Langenohl | |
| 4,846,769 | A | * | 7/1989 | Allen | F16G 13/00 403/2 |
| 4,864,696 | A | * | 9/1989 | Mittermaier | B67D 7/32 141/389 |

(Continued)

FOREIGN PATENT DOCUMENTS

EP    0694141    4/1999

*Primary Examiner* — Michael R Reid
*Assistant Examiner* — Christopher D Ballman
(74) *Attorney, Agent, or Firm* — Thompson Hine LLP

(57) ABSTRACT

A fluid dispensing system including a support structure, a hose configured to dispense fluid therethrough, and a support cable coupled to the hose. The hose is directly or indirectly releasably coupled to the support structure via the cable. The system further includes an extension and refraction mechanism configured to provide an adjustable effective length to the support cable.

33 Claims, 12 Drawing Sheets

(56) References Cited

U.S. PATENT DOCUMENTS

| | | | | |
|---|---|---|---|---|
| 4,884,528 | A | * | 12/1989 | Steudler, Jr. .............. A01K 7/00 119/72.5 |
| 5,135,029 | A | | 8/1992 | Anderson et al. |
| 5,466,082 | A | * | 11/1995 | Sherar ..................... B66C 15/00 403/157 |
| 5,564,471 | A | | 10/1996 | Wilder et al. |
| 5,699,823 | A | | 12/1997 | Thomson |
| 5,704,655 | A | * | 1/1998 | Lemburg ................. F16L 35/00 285/80 |
| 5,727,765 | A | | 3/1998 | Alvern |
| 5,836,361 | A | | 11/1998 | Koncsek |
| 6,199,579 | B1 | | 3/2001 | Taylor et al. |
| 6,629,511 | B2 | * | 10/2003 | De Bien .............. A01K 27/005 119/776 |
| 8,167,285 | B2 | * | 5/2012 | Balsells .................. F16B 21/18 267/1.5 |
| 8,444,014 | B2 | * | 5/2013 | McSpadden ............. B67D 7/08 141/192 |
| 2002/0179894 | A1 | * | 12/2002 | Albritton ................. A01K 3/00 256/1 |
| 2004/0182473 | A1 | | 9/2004 | Webb |
| 2006/0059666 | A1 | * | 3/2006 | Senink ............... B65H 75/4402 24/132 R |
| 2011/0214750 | A1 | | 9/2011 | Abrams |
| 2015/0144349 | A1 | * | 5/2015 | Dinkel .................... E21B 34/06 166/316 |

\* cited by examiner

BREAKAWAY HOSE SUPPORT

The present invention is directed to a fluid dispensing system, and more particularly, to a fluid dispensing system having a breakaway assembly.

BACKGROUND

Breakaway hose assemblies can be utilized in fluid dispensing systems, such as vehicle refueling stations and the like. The hose breakaway assembly is designed to provide a break in the fluid system when a sufficient breakaway force is applied thereto. For example, in the case of a drive-away event, the user of a refueling unit may inadvertently leave the nozzle in the vehicle tank and drive away. The breakaway hose is designed to break away from the base unit and provide a point at which the hose can separate in a controlled manner, and may also provide a closing valve to prevent or minimize loss of fuel.

Many fluid dispensing systems also utilize a hose support or hose retraction assembly to support the hose/nozzle during refueling. However, in some cases the hose support/retraction assembly can impede proper operation of the hose breakaway assembly.

SUMMARY

In one embodiment, the present invention is a fluid dispensing system including a support structure, a hose configured to dispense fluid therethrough, and a support cable coupled to the hose. The hose is directly or indirectly releasably coupled to the support structure via the cable. The system further includes an extension and retraction mechanism configured to provide an adjustable effective length to the support cable.

DETAILED DESCRIPTION

Figure 1:
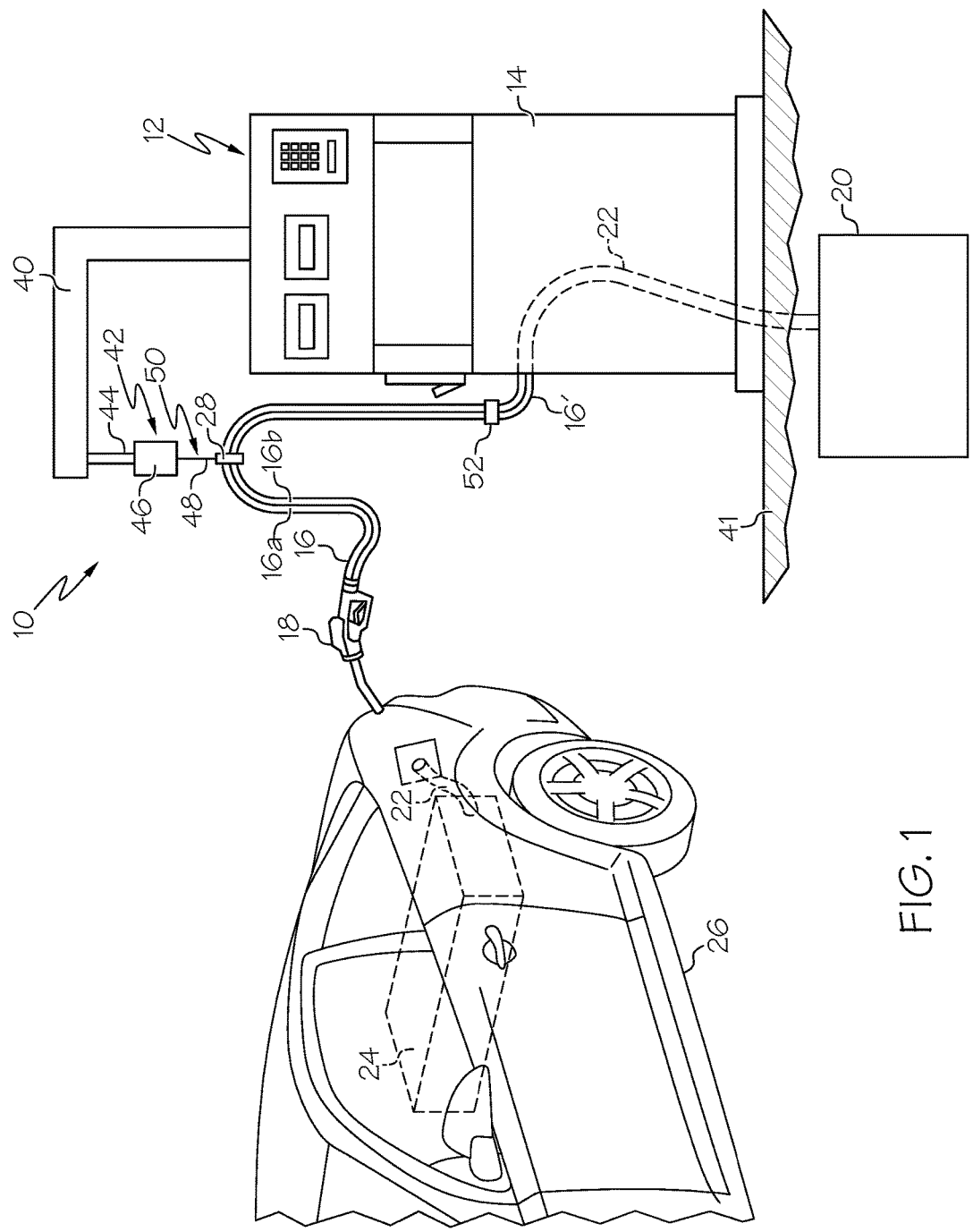
FIG. 1 is a front perspective view of a fluid delivery system utilizing a breakaway hose support assembly, with the nozzle spaced away from the vehicle refill pipe.

FIG. 1 is a schematic representation of a refilling system 10 including a dispenser, generally designated 12. The dispenser 12 includes a dispenser body 14, a hose 16 coupled to the dispenser body 14, and a nozzle 18 positioned at the distal end of the hose 16 (in some cases the nozzle 18 can be considered to be part of the hose 16). The hose 16 may be generally flexible and pliable to allow the hose 16 and nozzle 18 to be positioned in a convenient refilling position as desired by the user/operator.

Figure 2:
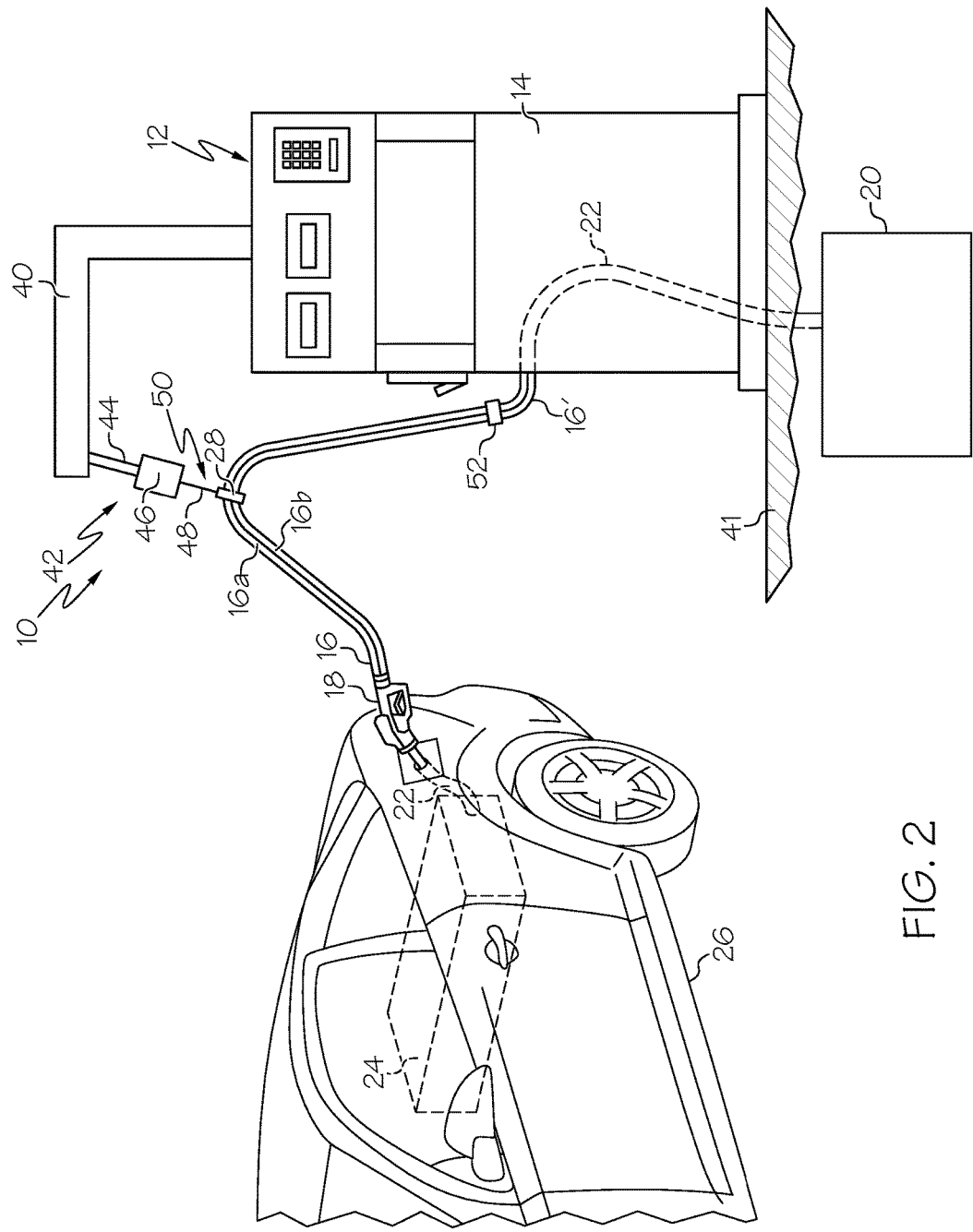
FIG. 2 is a front perspective view of the fluid delivery system of FIG. 1, with the nozzle inserted in the vehicle refill pipe and with the support cable in a retracted position.

The hose 16/dispenser 12 is in fluid communication with a fuel/fluid storage tank 20 via a conduit 22 that extends from the dispenser body 14 to the storage tank 20. The storage tank 20 may include or be fluidly coupled to a fuel pump (not shown) which is configured to pump fluid/fuel out of the storage tank 20 to the hose 16 and dispenser 12. During refilling, as shown in FIG. 2, the nozzle 18 is inserted into a fill pipe 22 of a fuel tank 24 of a vehicle 26. Fuel is then provided from the storage tank 20 to the fluid conduit 22, hose 16 and nozzle 18 and into the vehicle fuel tank 24.

The system 10 disclosed herein can be utilized to store/dispense any of a wide variety of fluids, liquids or fuels, including but not limited to petroleum-based fuels, such as gasoline, diesel, natural gas, biofuels, blended fuels, propane, oil, or ethanol the like. The system 10 can also be utilized to store/dispense compressed natural gas ("CNG"), which can take the form of methane in its gaseous state under high pressure, or a combination of gases of mostly methane. In this case the CNG is stored and dispensed under pressure (in one case in the range of about 2,900-3,600 psi).

In some cases, the hose 16 may include two hose portions 16a, 16b. One of the hose portions 16a can take the form of dispensing hose portion 16a through which fluid to be dispensed passes and enters the vehicle fuel tank 24. The other hose portion 16b can provide a path for venting, pressure relief, vapor recovery, etc., which is fluidly isolated from the hose portion 16a. With reference to FIGS. 6-13, each hose portion 16a, 16b can be a cylindrical hose portion that is coupled to the other hose portion, and the hose portions 16a, 16b extend in a parallel configuration. However, the hose 16 can take various other shapes and configurations and can include, for example, only a single hose portion, or a coaxial hose arrangement, etc.

Figure 6:
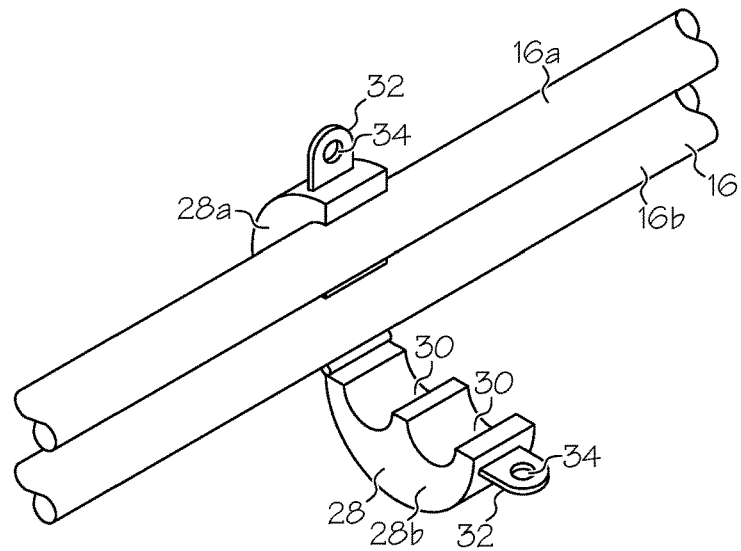
FIG. 6 is a front perspective view of a clamp of the system of FIGS. 1-5 shown in its open position.

With reference to FIG. 6, the system 10 can include or utilize a hose clamp 28 including two hose clamp portions 28a, 28b configured to be coupled together with the hose portions 16a, 16b therebetween. In particular the hose clamp 28 can include two hose cutouts 30, each cutout being configured to closely receive a hose portion 16a, 16b therein to keep the hose portions 16a, 16b aligned. The hose clamp portions 28a, 28b can be pivotally coupled together at a bottom end of the clamp 28, and each clamp portion 28a, 28b include an outwardly-protruding ear 32 at the top end. Each ear 32 can include an opening 34 such that a coupling connector, such as a pin 36 (see FIGS. 7 and 8), can be passed through the ears 32 to secure the hose clamp 28 in place.

Returning to FIG. 1, the dispenser 12 can include a support, generally designated 40. In the illustrated embodiment the support 40 is coupled to the dispenser body 14, although it should be understood that the support 40 could be a stand-along component, or include or be coupled to other structures (such as a roof of a refilling station, etc.). The support 40 can be positioned above the dispenser body 14. The support 40 can be, in one case, generally fixed and immovable relative to the surrounding/adjacent ground surface 41 and/or dispenser 12, and/or designed to be fixed and immovable and not designed/configured to be movable, and may be non-pivotable in one case. An extension-retraction/support assembly 42 is, in one case, coupled to the support 40 at one end and to the hose 16 at the other end.

The extension-retraction/support assembly 42 can include a connection 44, an extension/retraction mechanism 46, and a support cable 48. The support cable 48 can take any of a wide variety of forms, such as a wire, a wire cable, a braided cable, chain, a device with articulated joints, or nearly any other structure that can support the hose 16 and have the desired flexibility. The cable 48 can have a variety of lengths (when fully extended, when the extension-retraction assembly 42 is utilized), such as a length of at least about 1 foot in one case, or at least about 2 feet in another case, or at least as long as the nozzle 18 (including the nozzle spout), or at least about 1/10 of a length of the hose 16. These lengths of the cable 48 enable the hose 16 to be easily positioned as desired in nearly any orientation and location for ease of refueling. The cable 48 can in one case be flexible along its length (in one case, along its entire length or substantially its entire length) and able to bend or be deformed in any direction, including multi-planar directions, to provide ease of positioning and use.

Figure 3:
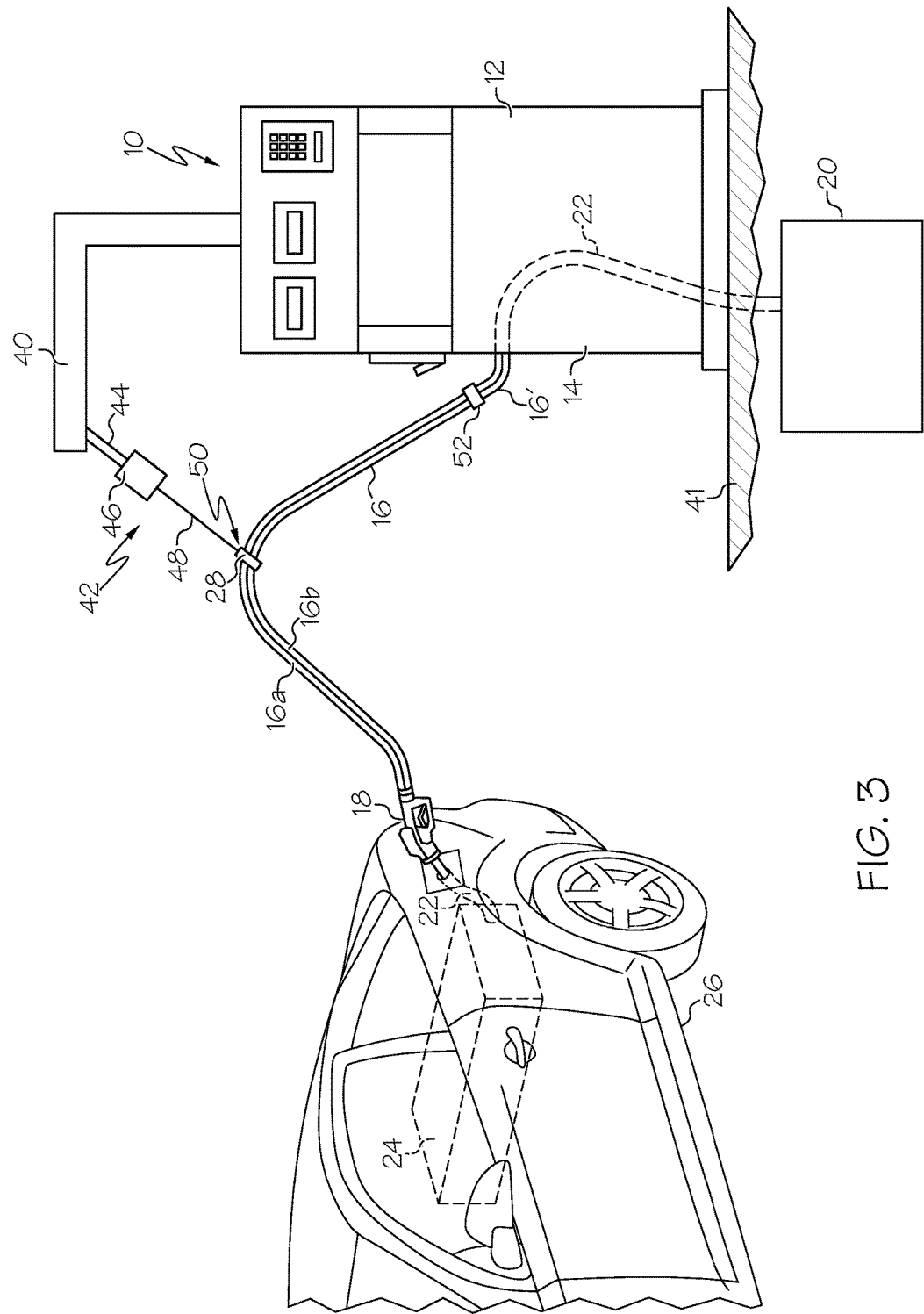
FIG. 3 is a front perspective view of the fluid delivery system of FIG. 2, with the support cable in an extended position.

The connection 44 can be flexibly connected to the support 40, and the support cable 48 can be connected to the hose 16 such that the cable 48/assembly 42 transfers at least part of the weight of the hose 16/nozzle 18 to the support 40 and/or provides a counterweight to provide ease of handling of the nozzle 18 by a user. In addition, or in the alternative, the assembly 42 can have extension-retraction capabilities. In this case, the cable 48 can be wrapped around a coil spring-drive drum, or some other mechanism, such that the cable 48 has an adjustable effective length. The assembly 42 can thus be configured to spool at least a portion of the cable 48 thereabout and to enable the portion to be unspooled therefrom during use/dispensing. The cable 48 is thus movable between a retracted position, as shown in FIG. 1, to an extended position as shown in FIG. 3, to provide increased range of motion during use and keep the hose 16 off the ground when not in use. The cable 48 may be biased into its retracted position such that the assembly 42/cable 48 returns to/resides in its retracted position in the absence of outside forces.

The support 40 can be releasably attached to the hose 16. More particularly, in one case the cable 48 is releasably coupled to the hose 16 such as by a breakaway assembly, generally designated 50. As shown in FIGS. 1-3, in one embodiment the cable 48 can be releasably coupled to the hose clamp 28; however, if desired the cable 48 can be directly coupled to the hose 16, or to other components coupled to the hose 16, including the nozzle 18.

The hose 16 can be releasably coupled to the dispenser body 14. In particular, the hose 16 can be designed to separate from the dispenser body 14 when a predetermined force is applied to the hose 16. In the illustrated embodiment the system 10 includes a hose breakaway device 52 positioned between the hose 16 and the dispenser body 14. The hose 16 can include a relatively short whip hose segment 16', and the hose breakaway device 52 is positioned between a main body of the hose 16 and the whip segment 16'. In this case if desired the whip hose segment 16' can be considered part of the dispenser body 14. However, it should be understood that the hose breakaway device 52 can be located at various positions along the hose 16, such as directly between a main body of the hose 16 and the dispenser body 14 (in which case a whip hose segment 16' is not utilized), or at intermediate position of the hose 16 other than that shown, or between the hose 16 and nozzle 18, etc.

The hose breakaway device 52 can incorporate a valve configured to close after a breakaway even to prevent or minimize loss or spilling of fluid. The hose breakaway device 52 can, in one case, take the form of the breakaway device 52 shown in U.S. Pat. No. 5,135,029, the entire contents of which are hereby incorporated by reference.

Figure 4:
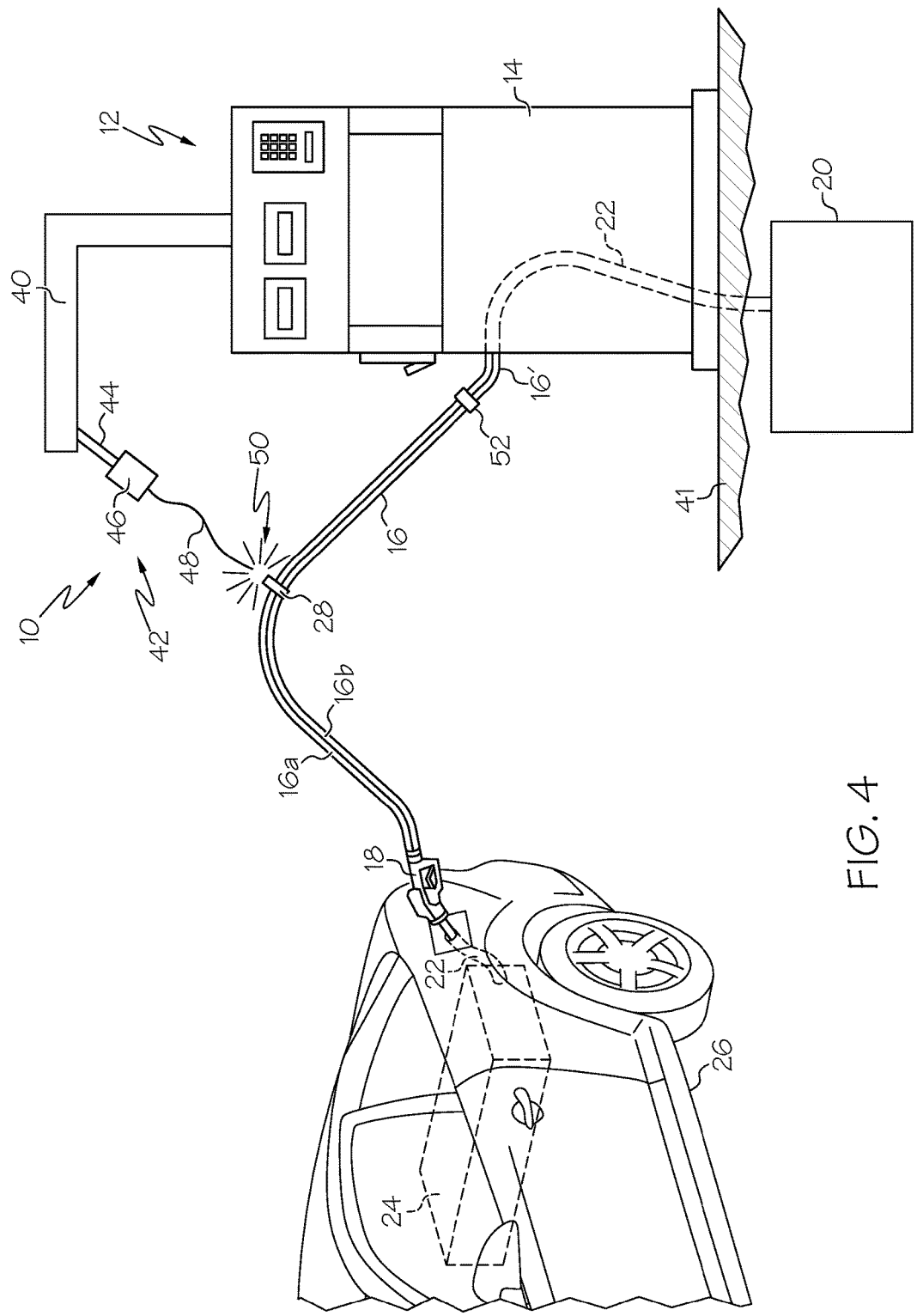
FIG. 4 is a front perspective view of the fluid delivery system of FIG. 3, with the support cable breaking away from the hose.
Figure 5:
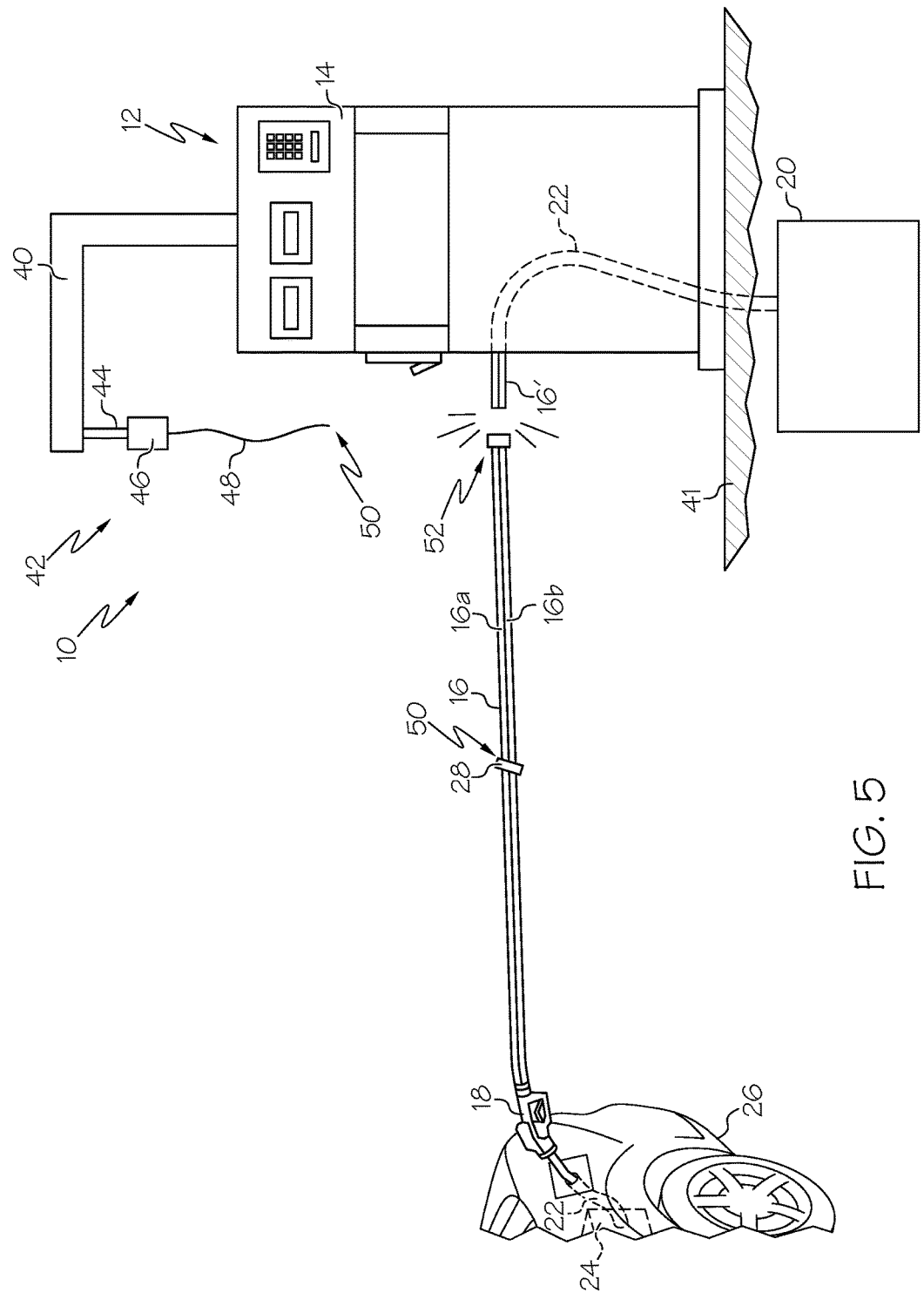
FIG. 5 is a front perspective view of the fluid delivery system of FIG. 4, with the hose breaking away from the base.

FIGS. 2-5 illustrate a breakaway event. In particular, in FIG. 2 it can be seen that the nozzle 18 is positioned in the vehicle fill pipe 22, and the cable 48 is generally in its retracted position. As shown in FIG. 3, as the vehicle 26 pulls away from the dispenser body 14, the cable is lengthened or extracted 48 and pulled to its maximum extent. Next, as shown in FIG. 4, as the vehicle 26 pulls further away the cable breaks 48 away from the hose 16. As noted above, this breakaway feature is by design and occurs when a predetermined force is applied to the cable 48, or when a force within a predetermined range is applied. As shown in FIG. 5, after the cable 48 breaks away and the vehicle 26 continues to drive away, the hose 16 is pulled taut into a generally linear shape, such that the force applied by the vehicle 26 becomes aligned along the length of the hose 16. The force is then applied to the hose breakaway device 52 in the aligned direction, and the hose 16 breaks away from the dispenser body 14/whip hose segment 16' in the designed manner.

Figure 4A:
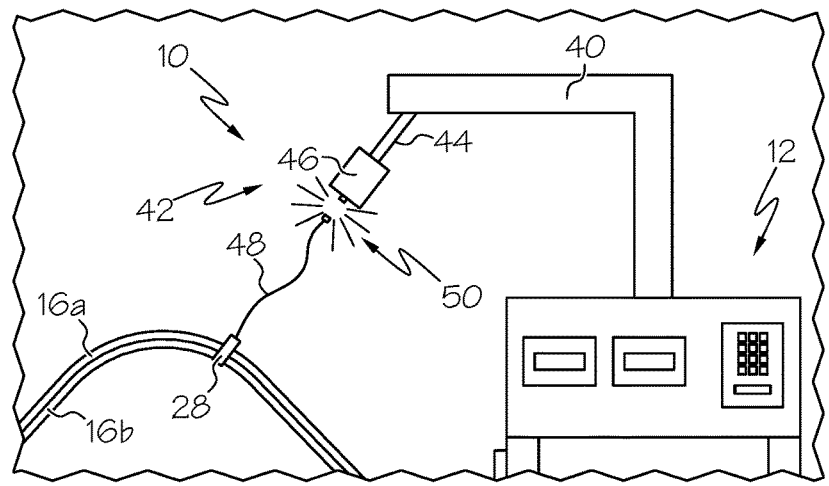
FIGS. 4A, 4B and 4C are detail views of the fluid delivery system of FIG. 2, showing various alternative breakaway points.
Figure 4B:
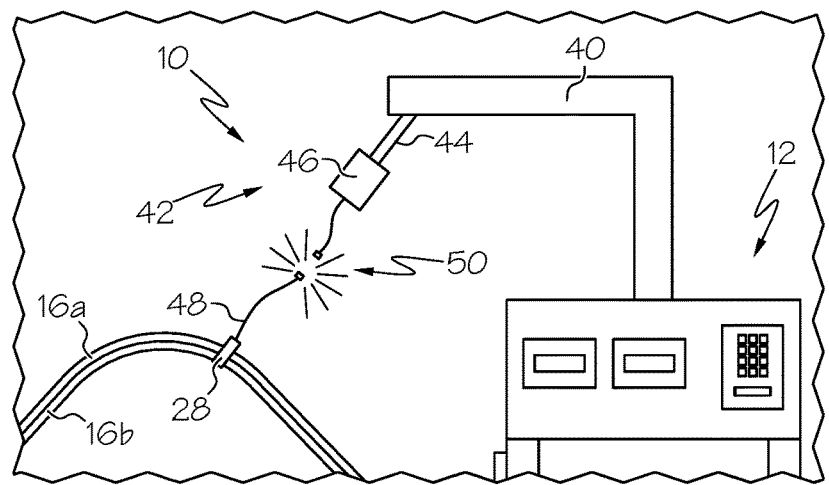
Figure 4C:
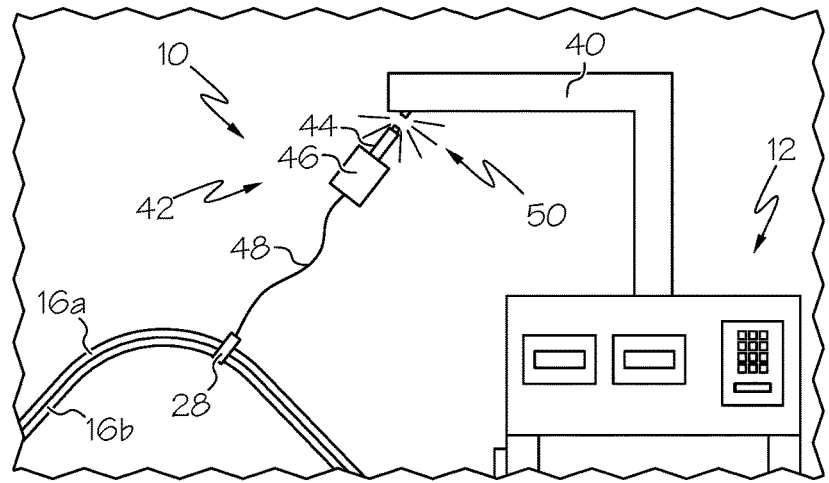

In the embodiment shown in FIG. 4 the cable 48 is shown as separating from the hose 16 at the point of connection between the cable 48 and the hose 16. This configuration can be useful in that it minimizes the number of components dragged with the vehicle 26 during a drive-away event, minimizing damage to the components, the roadway and other vehicle, surrounding dispensers, etc. However, it should be understood that the cable 48 may be configured to breakaway various other positions, such as at an intermediate point along the length of the cable 48, as shown in FIG. 4B. In addition the cable 48 may be designed to separate from the support 40 and/or the extension-retraction/support assembly 42 (FIG. 4A) and/or the extension-retraction support assembly 42 and/or connection 44 can be configured to break away from the support 40, as shown in FIG. 4C. In one case, the breakaway point for the cable 48 is positioned vertically above the breakaway point for the hose 16 during use and/or storage of the hose 16.

The breakaway nature of the cable 48 ensures that the hose breakaway device 52 functions in a proper manner. In particular, if the cable 48 were to not break away during a drive-away event, forces from the vehicle 26 could be applied to the support 40, causing the support 40 to deform or break. In addition, when the cable 48 remains attached during a drive-away event, the hose 16 is prevented from being pulled taut into a linear shape. The hose breakaway device 52 is typically configured to operate when the hose 16 is pulled taut and all vehicle forces are generally applied as tension forces to the hose 16. When the hose 16 is prevented from aligning along a linear shape, forces can be applied to the hose breakaway device 52 in manners and at angles other than those designed to be accommodated by the hose breakaway device 52, which can cause improper functioning of the hose breakaway device 52.

Most extension-retraction/support assemblies are accompanied by instructions that instruct the installer to not connect the cable 48 to the hose 16 at any point between the nozzle 18 and the hose breakaway device 52, which can avoid the issues outlined above. However, these instructions are not always followed, and in some cases it can be inconvenient to connect the cable 48 at the instructed position. The cable breakaway assembly 50 disclosed herein therefore provides ease of installation and ease of use, and ensures proper and consistent hose breakaway.

The force at which the cable 48 breaks away from the hose 16 should be lower than the force at which the hose 16 breaks away from the base 12 to ensure the cable 48 breaks away before the hose 16 to ensure proper operation of the system. The desired separation force for the hose 16 from the base 12 can vary according to the needs of the end-user, but one case is between about 100 and about 400 lbs., and is about 285 lbs. in one case. The desired separation force for the cable 48 from the hose 16 can also vary as desired, but is between about 20 and about 100 lbs. in one case, and more particularly between about 40 and about 60 lbs. in another case, and less than about 100 lbs. in yet another case, which may be sufficient to breakaway before casing damage to the support 40, and may be a force less than that required to activate most hose breakaway devices 52 to ensure proper operation of the system. In one case, then, the separation force for the cable 48 from the hose 16 is less than about 75% in one case, and less than about 50% in another case, than the separation force for the hose 16 from the base 12.

Figure 7:
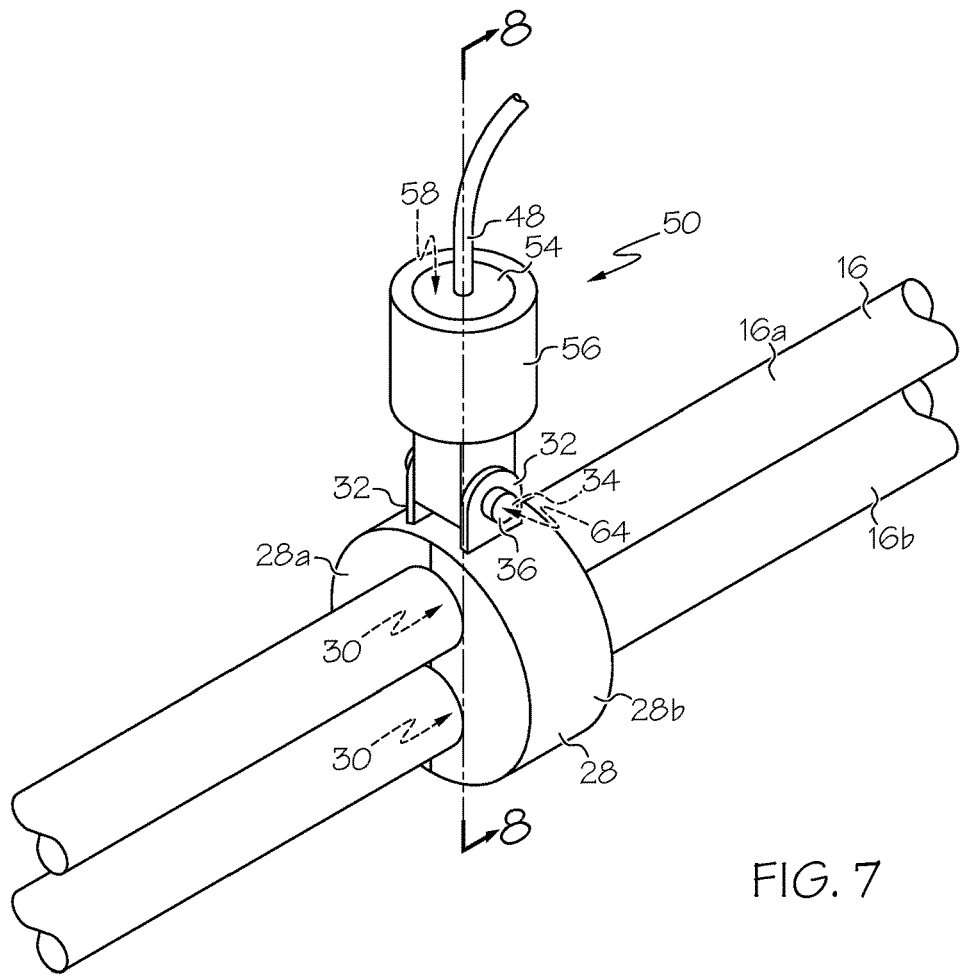
FIG. 7 is a front perspective view of the clamp of FIG. 6 in its closed position and shown in conjunction with a cable breakaway assembly and a support cable.
Figure 8:
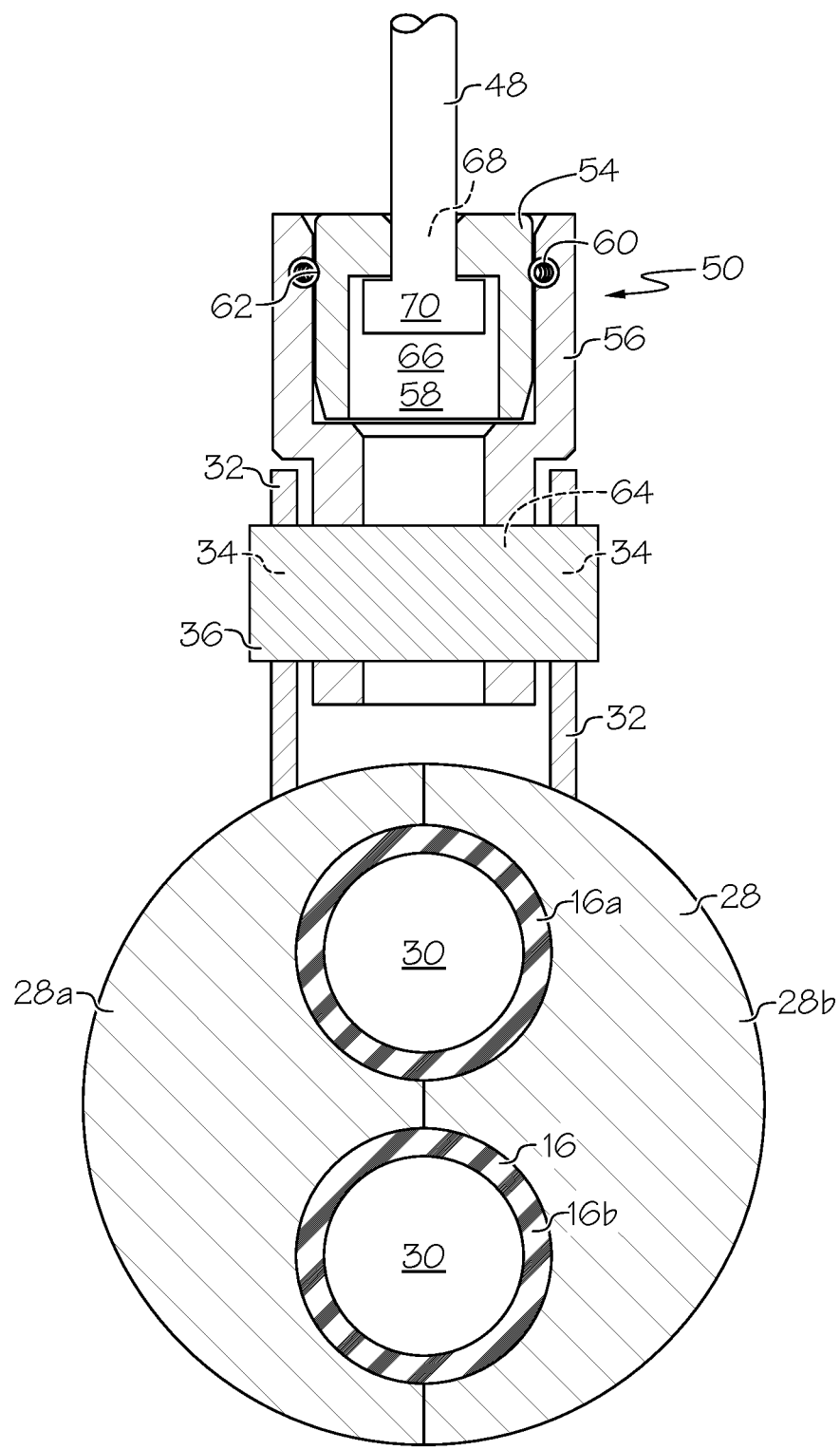
FIG. 8 is a cross section taken along line 8-8 of FIG. 7.
Figure 9:
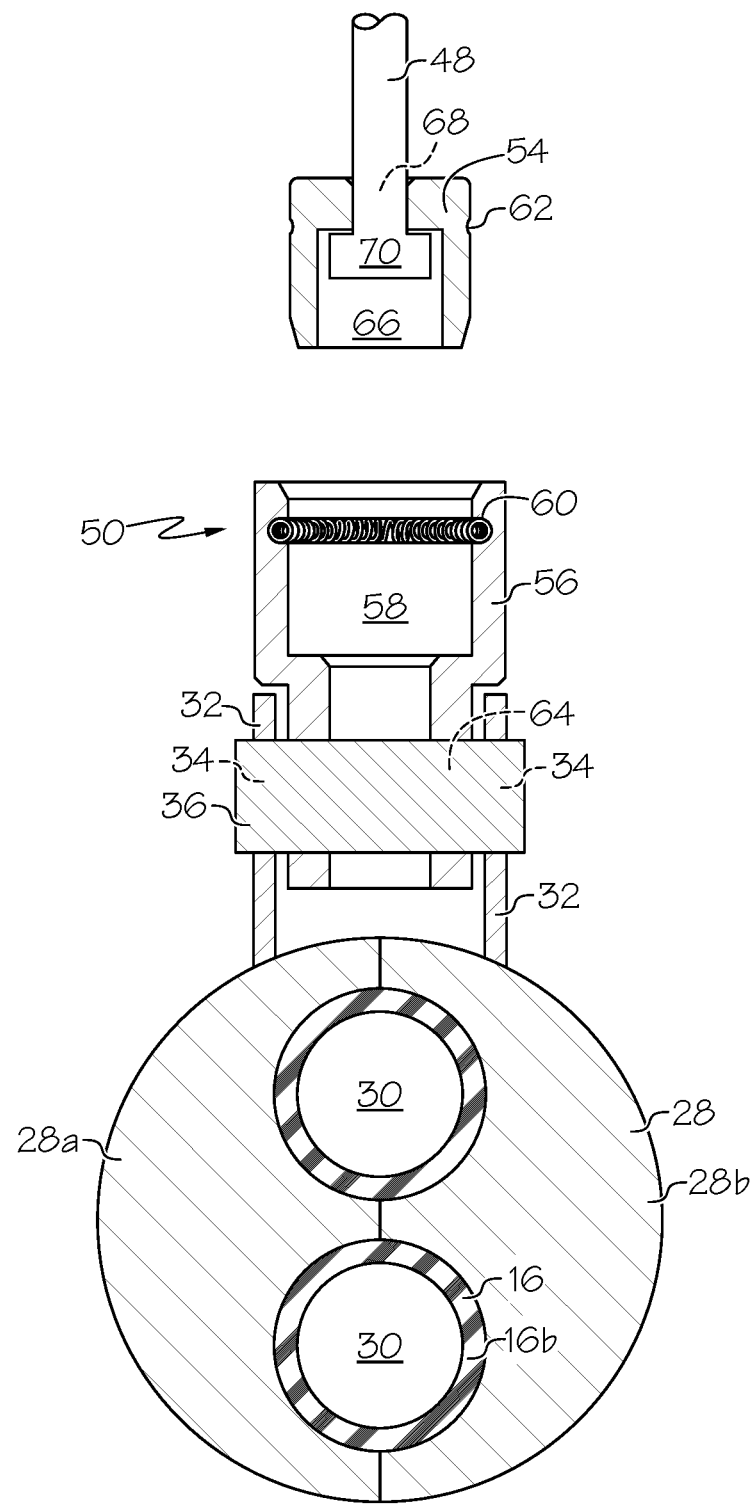
FIG. 9 shows the cross section of FIG. 8 with the spud retracted out of the housing.

Various mechanisms, arrangements and connections can be used as the breakaway assembly 50 to releasably couple the cable 48 to the hose 16 (or the support 40 to the hose 16), and a first embodiment is shown in FIGS. 7-9. In this embodiment the breakaway assembly 50 includes a spud or first portion 54 coupled to the cable 48, and a housing or a second portion 56 coupled to the hose 16/clamp 28. The spud 54 can be generally cylindrical, and the housing 56 can include a generally cylindrical recess 58 configured to closely receive the spud 54 therein. The housing 56 includes a projection, such as a canted (slant) coil spring 60, positioned in the recess 58 and extending circumferentially thereabout, 360 degrees in the illustrated embodiment. The spud 54 may include a groove or recess 62 extending circumferentially thereabout, 360 degrees in the illustrated embodiment, and configured to receive the spring 60 therein when the spud 54 is properly positioned in the housing 56, as shown in FIG. 8.

When a sufficient axial separation force is applied to the breakaway assembly 50, the spring 60 is urged radially outward sufficient to allow the spud 54 to be retracted from the housing 56, thereby causing the cable 48 to separate from the hose 16, as shown in FIG. 9. After the spud 54 is removed the spring 60 returns to its original shape. The separation force of the spud 54 can be controlled by adjusting various parameters, such as the gauge or thickness of the wire forming the spring 60, the inner diameter of the spring 60, the pitch and number of coils, the size and shape of the groove 62, etc.

The breakaway assembly 50 in FIGS. 7-9 is reconnectable without having to repair or replace any components. In particular, in order to reconnect the breakaway assembly 50 shown in FIG. 9, the spud 54 is inserted into the recess 58 of the housing 56 with sufficient force to cause the spring 60 to displace radially outwardly. The spud 54 is then seated into the housing 56 until the spring 60 is received in the recess 62, as shown in FIG. 8. Besides enabling re-use without having to replace or repair any parts, the re-connectable nature of the breakaway assembly 50 enables the breakaway assembly 50 to be tested prior to shipping.

It should be understood that the position of the spud 54 and the housing 56 can be reversed from that shown such that the spud 54 is connected to the hose 16 and the housing 56 is connected to the cable 48. The position of the groove 62 and spring 60 can also be reversed such that, for example, the spring 60 is positioned on the spud 54 and the groove 62 is positioned on the housing 56. In addition, various other components can be used as the projection in place of the spring 60, such as compressible materials, spring-biased components or the like.

The housing 56 and spud 54 can be connected to the hose 16/cable 48 in various manners. In the embodiment shown in FIGS. 7-9, the pin 36 which extends through the ears 32 of the clamp 28 is passed through an opening 64 of the housing 54 (see also FIG. 13) to secure the housing 54 to the clamp 28/hose 16. The pin 36 can be pressed or bolted in place. Moreover, in the illustrated embodiment the spud 54 includes a central opening 66 in communication with a smaller diameter access opening 68. A distal end of the cable 48, in one case including an enlarged head 70, is passed through the smaller diameter opening 68 to secure the cable 48 to the spud 54. In some cases, the enlarged head 70 can be integrally formed as shown, or could instead be formed by simply tying a knot in the cable 48, particularly when the cable 48 is made of a pliable material such as rope (e.g., nylon rope in one case) or the like. However it should be understood that the cable 48 can be connected to the spud 54 by any of a variety of other arrangements.

Figure 10:
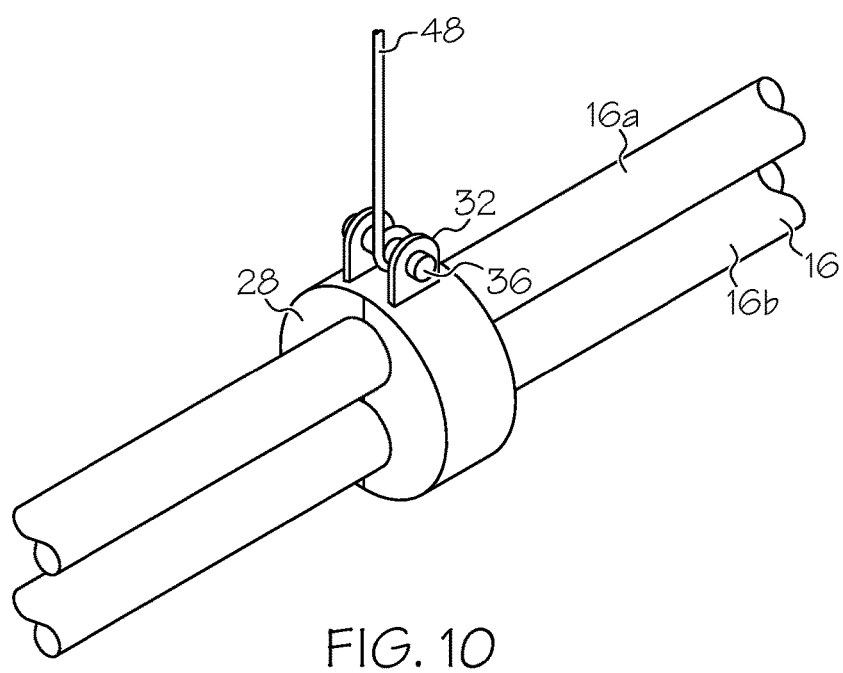
FIG. 10 is a front perspective view of an alternative breakaway assembly.

FIG. 10 illustrates another embodiment of the breakaway assembly. In this case the pin 36 extending between the ears 32 of the clamp 28 is a shear pin which is designed to break when predetermined shear forces are applied thereto. In the illustrated embodiment the cable 48 is directly secured to the shear pin 36, although the cable 48 could be indirectly coupled to the shear pin 36. In this embodiment, when the predetermined tension force is applied to the cable 48, the predetermined force is applied as a shear force to the pin 36, causing the pin 36 to break, allowing the cable 48 to separate from the hose 16. Although the shear pin embodiment requires a replacement shear pin 36 to reassemble the breakaway assembly 50, shear pins are generally relatively inexpensive and easy to obtain and install.

Figure 11:
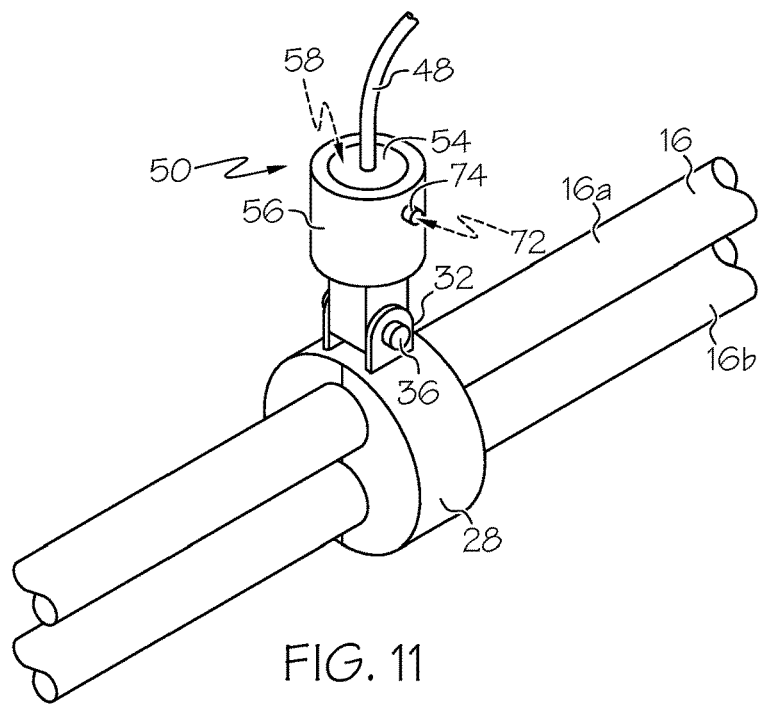
FIG. 11 is a front perspective view of another alternative breakaway assembly.
Figure 12:
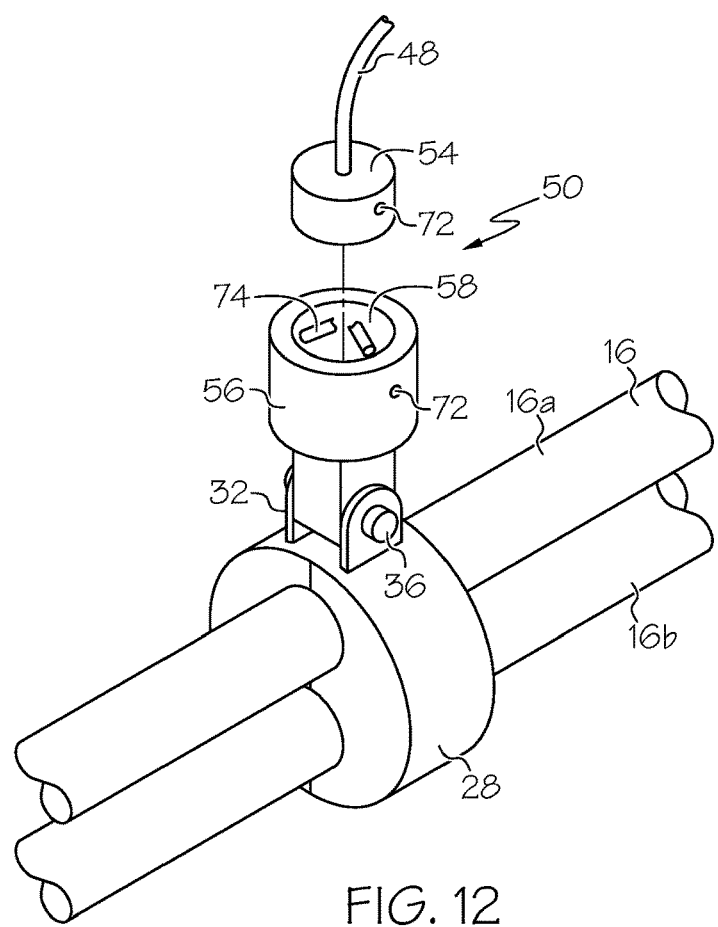
FIG. 12 shows the breakaway assembly of FIG. 11 after a breakaway event.

FIGS. 11 and 12 illustrate yet another embodiment of the breakaway assembly 50. In this configuration the breakaway assembly 50 can include a spud 54 and a housing 56 similar to the embodiment of FIGS. 8 and 9. However, in this case, rather than using a spring/projection and recess to releasably secure the spud 54 and the housing 56, the spud 54 and housing 56 each include radially-alignable holes 72 through which a shear pin 74 is received. When sufficient shear forces are applied to the shear pin 74, the shear pin breaks 74, as shown in FIG. 12, enabling separation of the cable 48 and hose 16.

Figure 13:
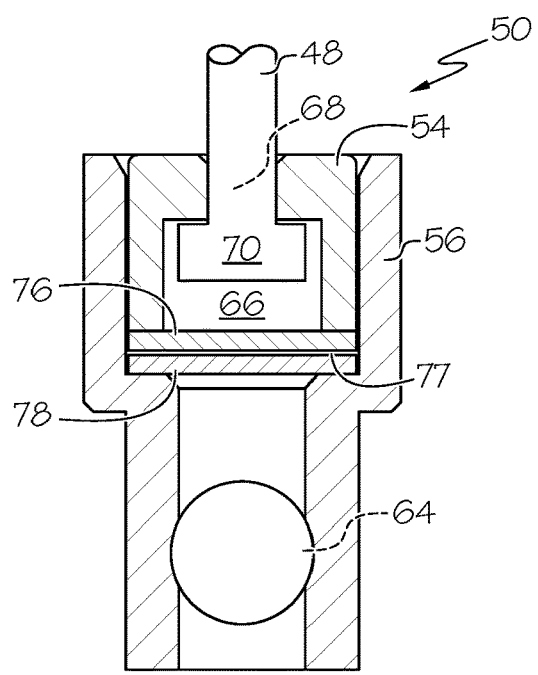
FIG. 13 is a side cross section of an alternative breakaway assembly.

FIG. 13 illustrates another embodiment of the breakaway assembly 50. In this case the breakaway assembly 50 includes a spud 54 positioned in a housing 56 similar to the embodiment of FIGS. 8 and 9. However, in this case, rather than using the spring/projection and recess, a lower surface or portion 76 of the spud 54 and a surface or portion 78 at the bottom of the recess 58 of the housing 56 are magnetically attracted to each other but positioned with a gap 77 therebetween as shown. One of the surfaces or portions 76, 78 can be magnetic and the other surface or portion 76, 78 can be magnetizable, or both surfaces or portions 76, 78 can be magnetizable. The magnetic attraction, and therefore separation force, can be controlled by selecting the type, number and size of magnets, among other factors.

Figure 14:
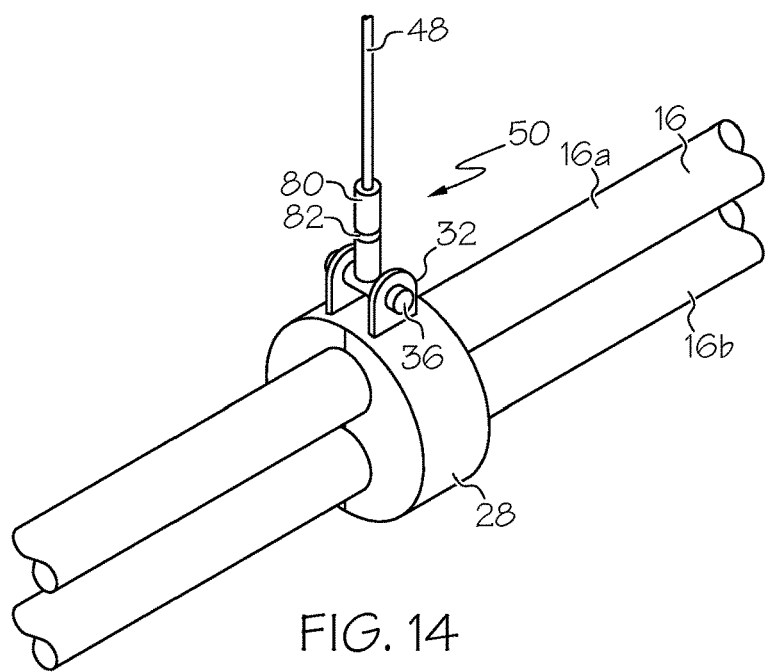
FIG. 14 is a front perspective view of another alternative breakaway assembly.

FIG. 14 illustrates another embodiment of the breakaway assembly 50, utilizing a tension pin 80 which is designed to break when a predetermined level of tension is applied thereto. In the illustrated embodiment the tension pin 80 includes a circumferential notch or groove 82 defining an area of weakness along which the tension pin 80 is designed to break.

In this manner it can be seen that the breakaway assembly 50 described herein provides various benefits. The assembly enables the cable to break away from the hose and/or the hose or nozzle to separate from the support to ensure the hose breaks away in a controlled manner as designed. The assembly also provides ease of installation and use. The assembly may be easy and intuitive to reconnection such that it can be reconnected by users with no particular training or expertise.

Having described the invention in detail and by reference to certain embodiments, it will be apparent that modifications and variations thereof are possible without departing from the scope of the invention.

What is claimed is:

1. A fluid dispensing system comprising:
   a support structure;
   a hose configured to dispense fluid therethrough;
   a support cable directly or indirectly coupled to said hose, wherein said hose is directly or indirectly releasably coupled to said support structure via said cable and a breakaway assembly, said breakaway assembly including a first portion coupled to the cable, a second portion coupled to the hose by a pin oriented transverse to an axis of the hose and defining a pivot axis, and a third portion configured to releasably attach said first and second portions and to allow separation of said first and second portions by deformation of said third portion and not breakage thereof when a predetermined force is applied thereto by said cable; and
   an extension and retraction mechanism configured to provide an adjustable effective length to said cable.

2. The system of claim 1 wherein the hose includes a nozzle at a distal end thereof and said cable has a maximum effective length at least as long as said nozzle.

3. The system of claim 1 wherein said support structure is fixed and non-movable relative to an adjacent ground surface, and wherein said cable generally extends from said support structure to said hose and is flexible along substantially its entire length thereof.

4. The system of claim 1 wherein said extension and retraction mechanism is configured to spool at least a portion of said cable thereabout and to enable said portion to be unspooled therefrom.

5. The system of claim 1 wherein said cable is releasably coupled to said hose, or said cable is releasably coupled to said support structure, or said cable is configured to break away at a position along its length thereof, or said cable is releasably coupled to said extension and retraction mechanism, or said extension and retraction mechanism is releasably coupled to said support.

6. The system of claim 1 wherein said cable is releasably coupled to said hose at a distal end of said cable.

7. The system of claim 1 further including a base, and wherein said hose is releasably coupled to said base such that when a predetermined separation force is applied to said hose at least part of said hose separates from said base at a hose separation location.

8. The system of claim 7 wherein said cable is releasably coupled to said hose such that said cable is configured to separate from said hose at a force less than said predetermined separation force.

9. The system of claim 7 wherein said base is coupled to said support structure.

10. The system of claim 7 wherein said cable is coupled to said hose at a position between said hose separation location and a distal end of said hose.

11. The system of claim 1 wherein said cable and said support structure are configured to support at least part of a weight of said hose during use of said hose.

12. The system of claim 1 wherein said second portion includes a recess configured to closely receive said first portion therein, and wherein said third portion includes a projection extending at least partially around said recess and configured to engage said first portion to releasably retain said first portion in said recess of said second portion.

13. The system of claim 12 wherein said projection includes a spring extending entirely around a perimeter of said recess, and wherein said first portion includes a groove configured to receive said projection therein.

14. The system of claim 1 wherein said hose is configured to separate from said support structure at a force less than about 100 lbs.

15. The system of claim 1 wherein said hose includes two discrete, fluidly isolated hose components, and wherein the system further includes a clamp fitting around and receiving said hose components therein, and wherein said cable is releasably coupled to said clamp.

16. The system of claim 1 wherein said hose is generally flexible such that when a separation force is applied thereto said hose seeks to align with said separation force.

17. The system of claim 1 wherein said hose includes a nozzle that is manually operable and configured to control dispensing of fluid from said hose, and wherein the system further includes a fluid-filled reservoir in fluid communication with said hose.

18. The system of claim 1 wherein said first portion is a separate and discrete component from said second portion, wherein the third portion is configured and positioned to directly contact and releasably couple said first and second portions, said third portion is a separate and discrete component from said first and second portions and the first portion is a separate and discrete component from the cable.

19. A fluid dispensing system comprising:
   a support structure;
   a hose configured to dispense fluid therethrough; and
   a flexible support cable generally extending from said support structure to said hose, wherein said hose is directly or indirectly releasably coupled to said support structure via said cable and a breakaway assembly, said breakaway assembly including a first portion coupled to the cable, a second portion pivotally coupled to the hose by a pin defining an axis oriented transverse to an axis of said hose, and a third portion configured to releasably couple said first and second portions, wherein the third portion is configured to deform but not break to allow said first and second portions to separate when a predetermined force is applied to the third portion by said cable.

20. The system of claim 19 further including a base, and wherein said hose is releasably coupled to said base such that when a predetermined separation force is applied to said hose at least part of said hose separates from said base at a hose separation location, wherein said cable is flexible along substantially an entire length thereof, and wherein said support structure is fixed and non-pivotable.

21. The system of claim 19 wherein said first portion is a separate and discrete component from said second portion, wherein the first portion is a separate and discrete component from the cable, wherein the third portion is configured to contact and releasably coupled said first and second portions, and wherein said third portion is a separate and discrete component from said first and second portions.

22. The system of claim 19 wherein said third portion is configured to releasably attach said first and second portions, and to allow separation of said first and second portions by yielding of said third portion and not breakage thereof when a force is applied thereto by said cable.

23. The system of claim 19 wherein said third portion is a compressible material other than a spring and which can be sufficiently deformed without breakage to allow said first and second portions to separate.

24. The system of claim 19 wherein the pivot axis is oriented perpendicular to the axis of the hose.

25. A method comprising:
accessing a fluid dispensing system including a support structure, a hose configured to dispense fluid therethrough, and an extension and retraction mechanism configured to provide an adjustable effective length to a support cable; and
coupling said support structure to said hose such that said hose is directly or indirectly releasably coupled to said support structure via said cable and a breakaway assembly, said breakaway assembly including a first portion coupled to said cable, a second portion pivotally coupled to said hose by a pin defining an axis oriented transverse to an axis of said hose, and a third portion configured to releasably attach said first and second portions, wherein the third portion is configured to deform but not break to allow said first and second portions to separate when a predetermined force is applied to the third portion by said cable.

26. A system for use with a fluid dispensing system comprising: a breakaway assembly configured to releasably attach a hose, which is configured to dispense fluid therethrough, to a support via a cable, wherein said breakaway assembly includes a first portion configured to be coupled to one of said hose or said cable, a second portion configured to be pivotally coupled to the other one of said hose or said cable by a pin defining an axis oriented transverse to an axis of the other one of said hose or said cable, and a third portion configured to releasably attach said first and second portions and to allow separation of said first and second portions by deformation of said third portion and not breakage thereof due to a force applied by said cable.

27. The system of claim 26 wherein said third portion is configured to allow separation of said first and second portions by deformation of said third portion and not breakage thereof solely due to force applied thereto by said cable.

28. The system of claim 26 wherein said third portion is a spring coupled to said second portion.

29. A fluid dispensing system comprising: a support structure;
a hose configured to dispense fluid therethrough; and
a flexible support cable generally extending from said support structure to said hose, wherein said hose is directly or indirectly releasably coupled to said support structure via said cable and a breakaway assembly, wherein said breakaway assembly is pivotally coupled to the hose by a pin defining an axis oriented transverse to an axis of said hose, the breakaway assembly including a first portion coupled to the cable, a second portion coupled to the hose and a third portion configured to releasably couple said first and second portions and to allow separation of said first and second portions by deformation of said third portion due to a force applied by said cable.

30. The system of claim 29 wherein the first portion is a separate and discrete component from the cable, wherein said third portion is a separate and discrete component from said first and second portions, and wherein said third portion is a spring.

31. The system of claim 30 wherein said spring is coupled to said first portion when said first and second portions are separated.

32. The system of claim 30 wherein said spring is coupled to said second portion when said first and second portions are separated.

33. The system of claim 29 wherein the second portion is pivotally coupled to the hose about an axis oriented transverse to an axis of said hose such that any pivoting of said second portion relative to the hose is providable strictly about said axis and not due to any deformation or flexibility of the cable or the hose.

* * * * *